US006766980B1

(12) United States Patent
Greenston

(10) Patent No.: US 6,766,980 B1
(45) Date of Patent: Jul. 27, 2004

(54) PROP WASH DEFLECTOR

(76) Inventor: Stephen Greenston, Steinpilzweg 58, 70599 Stuttgart (DE)

( * ) Notice: Subject to any disclaimer, the term of this patent is extended or adjusted under 35 U.S.C. 154(b) by 0 days.

(21) Appl. No.: 10/625,670

(22) Filed: Jul. 24, 2003

(51) Int. Cl.[7] .................................................. B64C 7/00
(52) U.S. Cl. ............................ 244/17.11; 244/118.1; 244/130
(58) Field of Search .................... 244/17.11, 118.1, 244/130, 137.4

(56) References Cited

U.S. PATENT DOCUMENTS

| | | | | |
|---|---|---|---|---|
| 864,672 A | * | 8/1907 | Mccormick | 244/73 B |
| 3,067,528 A | * | 12/1962 | Agusta | 244/110 |
| 3,131,888 A | * | 5/1964 | Jensen et al. | 244/109 |
| 3,175,785 A | * | 3/1965 | De Tore et al. | 244/109 |
| 3,544,047 A | * | 12/1970 | Gabriel | 244/17.11 |
| 3,572,615 A | * | 3/1971 | Firestone | 244/117 R |
| 5,927,649 A | | 7/1999 | Nykiforuk | |
| 6,437,708 B1 | | 8/2002 | Brouwer | |

* cited by examiner

*Primary Examiner*—Galen Barefoot
(74) *Attorney, Agent, or Firm*—Donald C. Casey

(57) ABSTRACT

A structure for increasing the cargo carrying capacity of a helicopter when the cargo is suspended below the helicopter chassis is described. The structure includes a depending skirt surrounding the helicopter wheels or struts and extending outwardly over the suspended cargo. The skirt is substantially frustro-conical in shape and provides a peripheral lip extending substantially horizontally for deflecting prop down wash from the helicopter rotor away from the suspended cargo.

11 Claims, 1 Drawing Sheet

PROP WASH DEFLECTOR

FIELD OF THE INVENTION

This invention relates to an improvement in helicopter designs for cargo carrying helicopters and in particular to a prop wash deflector for increasing the carrying capacity of such ships.

DESCRIPTION OF THE PRIOR ART

For many years helicopters have been used to move large or heavy objects by suspending the objects below the helicopter. In this way cargo can be carried to great heights quickly and safely. There are many examples of the use of helicopters in construction projects and even for erecting statues and other monuments.

Helicopters have also been used to bring material into remote locations, to map rugged terrain and in general to move cargo. In each instance equipment or cargo is suspended from the helicopter on pallets or the like.

It has been known for many years that the carrying capacity of a helicopter with a suspended cargo is not as high as would be expected. In other words, the carrying capacity is less than the theoretical number calculated based upon the thrust of the engine. While the carrying capacity also is affected by the number of passengers and cargo stored within the helicopter itself, the overall load affects fuel consumption and safety. Therefore it would be desirable to provide increased capacity with a given helicopter size and engine.

As is well known, the helicopter rotor generates a down draft which is responsible for lift. Impact of the down draft or prop wash on suspended cargo has the effect of forcing the helicopter to work against its self as the impact of this prop wash increases the effective weight of a suspended load.

Accordingly, there is a need to minimize the effect of prop wash on a suspended load.

In U.S. Pat. No. 5,927,649 there is described a suspendible carrier for a helicopter which is adapted to received multiple loads of cargo. The carrier includes a suspension assembly which is a platform which extends horizontally, onto which multiple cargo loads may be attached. The suspension assembly includes a skirt which extends downwardly and outwardly at an angle to the assembly. The skirt, however, is described as including a pair of side plates and a front plate that flare outwardly and is intended to guide a coupling assembly for cargo pickup. The suspension assembly is mounted to a cable which extends downwardly from the bottom of the helicopter. The skirt assembly, while it extends outwardly and downwardly, does not extend around the circumference of the suspension assembly and does not protect the assembly itself from prop down wash from the helicopter.

In U.S. Pat. No. 6,437,708 there is described a helicopter used for aerial land marking and surveying which has a suspended instrument pod which in turn has a conical housing surrounding instruments. While the conical housing does surround the instrument package, it in turn is supported by an external shell which is cylindrical. While the patent recognizes that it is desirable to have the operator of the equipment on the ground rather than in the helicopter in order to increase the capacity of the helicopter, there is no recognition that prop wash on the instrument package also would effect the carrying capacity of the helicopter.

Accordingly, there is a need for a structure attached to the helicopter for deflecting prop wash from suspended cargo to increase the carrying capacity and fuel economy.

SUMMARY OF THE INVENTION

It has been discovered that a skirt-like prop wash deflector can be mounted on a helicopter to deflect the prop wash from suspended cargo. The deflector of this invention in a preferred embodiment would be mounted integral to the helicopter chassis and extending outwardly from below the doors and over the helicopter skids or wheels so that prop wash would be deflected downwardly and outwardly from the helicopter chassis to thereby minimize the downward force of the prop wash on the helicopter itself, and eliminate its impact on suspended cargo.

Accordingly it is an object of this invention to provide a prop wash deflector to eliminate the impact of helicopter prop wash on suspended cargo.

It is another object of this invention to provide an integral deflector attached to the chassis of the helicopter for deflecting prop wash from the helicopters rotor away from the chassis of the helicopter, and for screening any suspended cargo.

It is yet another object of this invention to provide a deflector mounted on the chassis of a helicopter which is a plexiglass skirt which extends downwardly and outwardly from the helicopter chassis with a peripheral lip extending substantially horizontally and which covers any suspended cargo protecting the same from the prop wash generated by the helicopter rotor.

These and other objects will become readily apparent with reference to the drawings and following description wherein:

DETAILED DESCRIPTION OF THE INVENTION

Figure 1:
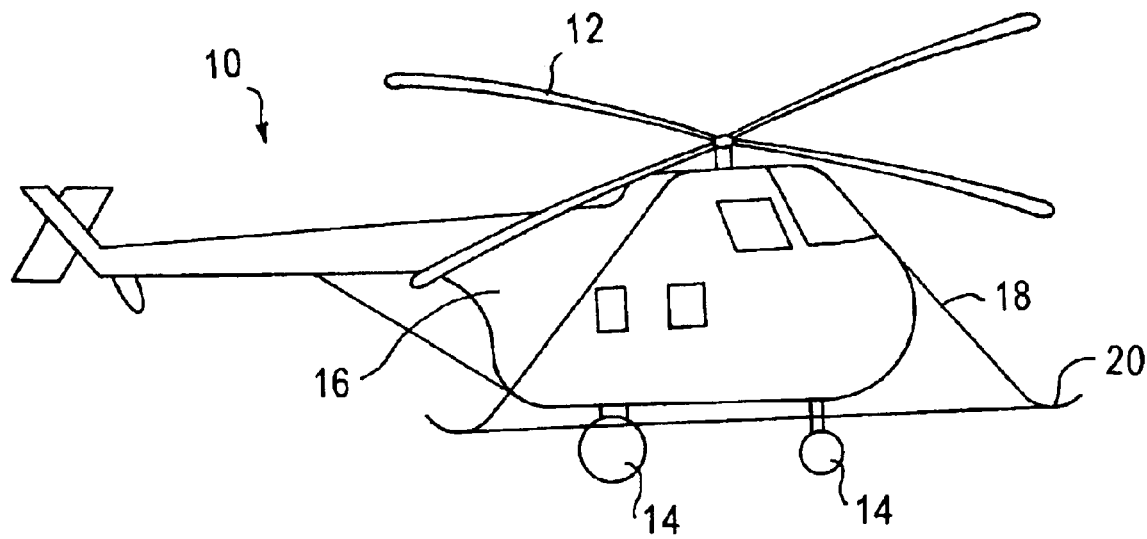
FIG. 1 is a side view of a typical helicopter mounting the deflector of this invention.
Figure 2:
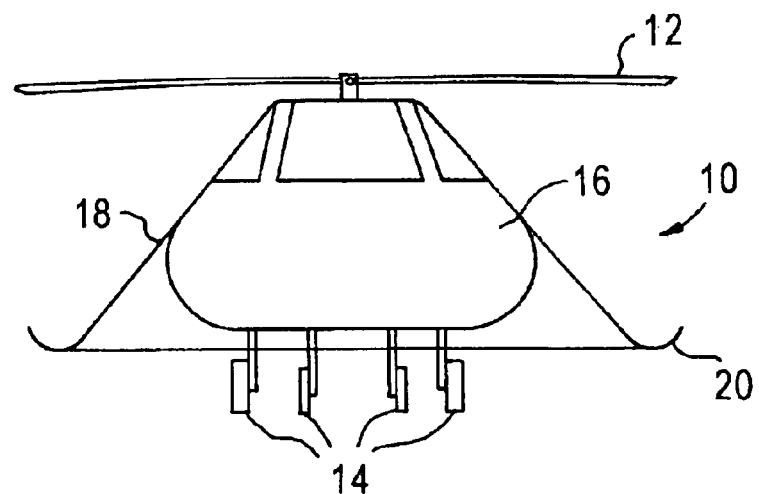
FIG. 2 is a front view of the helicopter of FIG. 1.

The drawings show a typical helicopter 10 having a rotor 12 and wheels 14. This invention is not intended to be limited to the type of helicopter. For example, helicopters also may have skids or pontoons (not shown) instead of wheels and large cargo carrying helicopters can have twin rotors (also not shown). Depending from the helicopter chassis 16 is a conical deflector 18 of this invention having a flared lip 20 depending therefrom. While the lip 20 may extend outwardly beyond the tips of the rotors props 12 as shown, it is not necessary. It is only necessary that the lip 20 extend outwardly beyond the cargo being carried.

As shown in the drawings, the conical deflector 18 could enclose the chassis 16, or could be integral with the cockpit housing the pilot. The deflector should be a clear material such as plexiglass to facilitate visual observation by the pilot.

As the helicopter rotor rotates to provide lift, the downwardly directed air will impact on the conical deflector 18, and be directed outwardly by the lip 20. In the absence of such deflector, the prop wash would be directed downwardly onto the cargo being carried and can add considerably to the weight of such cargo. Elimination of this prop wash should increase the carrying capacity of the helicopter and decrease fuel consumption for more efficient operation.

A variety of different structural features can be incorporated in the concept of this invention. For example, the conical deflector or skirt can be shaped according to the cargo. The conical deflector can be bell-shaped, or hill-shaped, and could be an integral part of the helicopter structure. In the alternative, the conical deflector or skirt can be constructed in sections to form the desired shape and can be quickly attachable or detachable. There also could be an automatic release so that the helicopter, after delivering its payload, can free itself from the conical deflector structure. In a preferred embodiment of this invention the conical deflector would be clear plastic, but this invention is intended to include any type of construction material whether clear, opaque or both. Finally, the conical deflector or skirt could be mounted on the helicopter, or could be suspended below the helicopter by a line connecting the cargo and the helicopter. The important feature being that the conical deflector or skirt deflects the prop wash from the cargo. The form of the lip on the conical deflector is described as substantially horizontal, but is intended to describe a lip dependent upon the wind stream so as to limit the formation of eddies.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed:

1. In a cargo carrying helicopter wherein the cargo is suspended below the helicopter chassis the improvement comprising:

a helicopter prop wash deflector means for defecting prop wash away from said cargo including a skirt disposed between the helicopter chassis and the cargo and extending outwardly and opening downwardly over the suspended cargo, said skirt terminating in an outwardly directed circumferential lip, said skirt being rigid and substantially frustro-conical.

2. The improvement of claim 1 wherein said skirt extends over the helicopter landing gear.

3. The improvement of claim 1 wherein the lip extends outwardly in a substantially horizontal direction.

4. The improvement of claim 3 wherein the lip is semi-circular in cross section, opening upwardly.

5. The improvement of claim 1 wherein said skirt is plexiglass.

6. The improvement of claim 1 wherein the skirt is substantially elliptical in cross-section.

7. The improvement of claim 1 wherein the cargo is anchored to the skirt.

8. The improvement of claim 1 wherein the skirt is attached to the helicopter chassis.

9. The improvement of claim 1 wherein the skirt comprises a plurality of interconnected sections.

10. The improvement of claim 9 wherein at least one of said sections is opaque.

11. The improvement of claim 9 wherein at least one of said sections is transparent.

* * * * *